Nov. 18, 1947.  R. W. LEISY  2,430,939
PRODUCTION OF LEAD CHROMATE
Filed Sept. 3, 1943
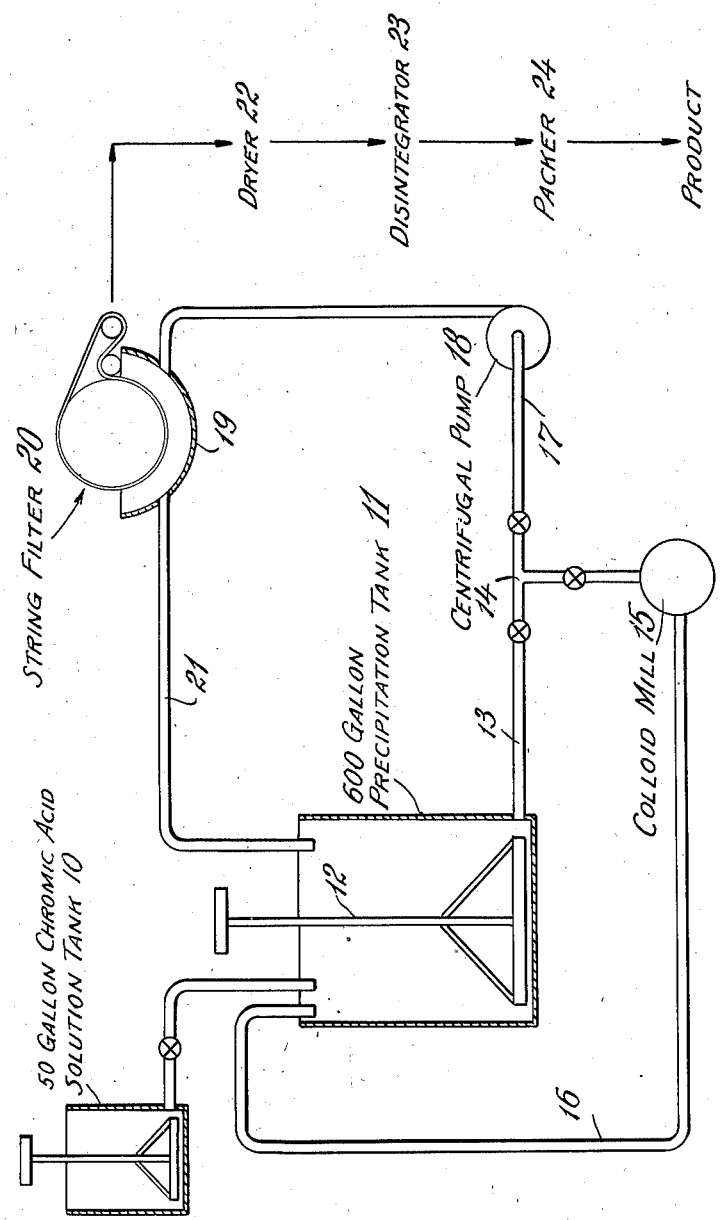
INVENTOR
*Reuben W. Leisy*
BY
*Pennie Davis Marvin & Edmonds*
ATTORNEYS Patented Nov. 18, 1947

2,430,939

UNITED STATES PATENT OFFICE 2,430,939

PRODUCTION OF LEAD CHROMATE

Reuben W. Leisy, Palmerton, Pa., assignor to The New Jersey Zinc Company, New York, N. Y., a corporation of New Jersey Application September 3, 1943, Serial No. 501,061

4 Claims. (Cl. 23—57)

This invention is concerned with the production of lead chromate, particularly basic lead chromate, and provides an improved method for the manufacture of lead chromate pigments for use in paints, especially rust protective paints.

It has been proposed heretofore, for example in United States Patent No. 2,044,244, to produce lead chromate by reacting chromic acid with a lead salt in solution. Thus, a reagent capable of forming a soluble lead salt, for example acetic acid or hydrofluoric acid, may be added to a slurry of lead oxide, chromic acid being added gradually a little at a time so as to precipitate lead chromate from the water-soluble lead salt formed previously from the lead oxide.

As the result of my investigations, I have discovered that it is possible to form excellent lead chromate and basic lead chromate pigments by directly reacting chromic acid with lead oxide while the latter is suspended in an aqueous slurry, i. e. without first dissolving the lead oxide to form a soluble lead salt.

In accordance with my invention, an aqueous slurry of lead oxide (PbO) is treated with an aqueous solution of chromic acid ($CrO_3$) with resulting direct reaction of the two to form (a) lead chromate ($PbCrO_4$), (b) basic lead chromate ($Pb_2CrO_5$) or (c) a mixture of the two.

The relative proportions of chromic acid and lead oxide control the proportion of lead chromate and basic lead chromate formed. If one mol of PbO is brought into reaction with one mol of $CrO_3$, the precipitate is lead chromate. The aged pulp of a precipitate formed from one mol of $CrO_3$ and one mol of PbO in accordance with my invention is acidic in reaction, with a pH of 1.4. Should the ratio of PbO to $CrO_3$ be increased to 3:2, lead chromate ($PbCrO_4$) is formed as in the previous instance, but the aged pulp will be alkaline, with a pH of 8.6. In general, I prefer to operate so as to obtain an alkaline pulp.

I have found that it is particularly desirable to conduct my invention in such fashion as to produce basic lead chromate ($Pb_2CrO_5$). When two mols of PbO are employed for each mol $CrO_3$, a part of the precipitate consists of lead chromate, the balance being basic lead chromate and some unreacted lead oxide. If, however, the molecular ratio of PbO to $CrO_3$ is increased to 3:1, the precipitate is a mixture of $Pb_2CrO_5$ with unreacted lead oxide and is free of $PbCrO_4$. The aged pulp obtained in such a reaction is markedly alkaline with a pH of 10.5.

A pigment which yields optimum results in paint under certain conditions is obtained with a molecular ratio of PbO to $CrO_3$ of 4:1 and, in general, I prefer to employ this ratio. However, excellent results can be obtained with a range of PbO to $CrO_3$ ratios of from 3:1 to 6:1. In fact, even higher ratios of PbO to $CrO_3$ may be employed. In such cases, however, the product is equivalent to a mixture of lead oxide with the combination of unreacted lead oxide and $Pb_2CrO_5$ that is obtained in the specified range of 3:1 to 6:1.

The presence of $Pb_2CrO_5$ in the pigment produced in accordance with my invention may be shown by the X-ray diffraction pattern of this substance in X-ray diagrams of the pigment.

My invention will be more thoroughly understood in the light of the following detailed description, taken in conjunction with the accompanying flow sheet of apparatus adapted to the practice of the invention.

Referring to the flow sheet, the equipment comprises a 50 gallon chromic acid solution tank 10 which discharges into a 600 gallon precipitation tank 11. This tank is provided with an agitator 12. A pipe 13 on the outlet of the precipitation tank connects through a valved T 14 to a colloid mill 15. The colloid mill can be employed to circulate reacting slurry through a line 16 back into the precipitation tank. The other branch 17 of the T is connected to the inlet of a centrifugal pump 18. This pump can be employed to introduce reacted slurry into the tank 19 of a string filter 20. Pipe 21 serves as an overflow to maintain a constant level in the tank 19. Lead chromate filter cake formed on the string filter is removed to a dryer 22 from whence it passes to a conventional disintegrator 23. The product then goes to a conventional packer 24 and is ready for market.

To take a specific example, lead oxide in the amount of 899.28 pounds is pulped in 431 gallons of water in the 600-gallon tank by agitation and recirculation of the pulp through the colloid mill for 30 minutes. To the pulp thus formed there is added as rapidly as possible 36 gallons of chromic acid containing 100.72 pounds of $CrO_3$. The pulp to which the chromic acid has been added is agitated vigorously for 2 hours. Thereafter, it is aged for 24 hours while it is kept in suspension by slow agitation. After aging, the solids are removed by filtration on the string filter. The cake thus formed is dried at 110° C., disintegrated and packed.

I claim:

1. The method of producing a lead chromate from chromic acid and lead oxide which comprises subjecting a suspension of solid particles of lead oxide in the form of an aqueous slurry to dispersion in a colloid mill, and reacting the chromic acid directly with the solid particles of lead oxide while the latter is dispersed in said aqueous slurry.

2. Process according to claim 1 in which the ratio of PbO to $CrO_3$ employed is such as to yield after aging an alkaline pulp.

3. Process according to claim 1 in which the molecular ratio of PbO to $CrO_3$ is at least 2:1.

4. Process according to claim 1 in which the molecular ratio of PbO to $CrO_3$ ranges from 3:1 to 6:1.

REUBEN W. LEISY.

REFERENCES CITED

The following references are of record in the file of this patent:

UNITED STATES PATENTS

| Number | Name | Date |
|---|---|---|
| 2,044,244 | Harshaw | June 16, 1936 |

FOREIGN PATENTS

| Number | Country | Date |
|---|---|---|
| 515,995 | Great Britain | Dec. 20, 1939 |

OTHER REFERENCES

Mellor, "Comprehensive Treatise on Inorganic & Theoretical Chemistry," vol. XI, 1932; pp. 301 and 302. Longmans, Green & Co., London, New York, Toronto.